US007832789B2

(12) United States Patent
Craigo et al.

(10) Patent No.: US 7,832,789 B2
(45) Date of Patent: Nov. 16, 2010

(54) INTEGRATED VEHICLE DOOR HINGE AND HANDLE

(75) Inventors: Kelly G. Craigo, Harper Woods, MI (US); Wade W. Bryant, Grosse Pointe Farms, MI (US); Therese A. Tant, Royal Oak, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 439 days.

(21) Appl. No.: 11/955,431

(22) Filed: Dec. 13, 2007

(65) Prior Publication Data

US 2009/0151125 A1 Jun. 18, 2009

(51) Int. Cl.
*B60J 5/04* (2006.01)

(52) U.S. Cl. .............. 296/146.11; 296/1.02; 296/146.7; 16/412; 292/336.3; 70/237

(58) Field of Classification Search ............ 296/146.11, 296/1.02, 146.7; 16/412, 221; 49/502; 292/336.3; 70/237

See application file for complete search history.

(56) References Cited

U.S. PATENT DOCUMENTS

| | | | | |
|---|---|---|---|---|
| 3,095,600 | A * | 7/1963 | Bretzner | 16/224 |
| 5,910,077 | A * | 6/1999 | Aumiller et al. | 49/460 |
| 7,178,853 | B2 * | 2/2007 | Oxley et al. | 296/146.11 |

* cited by examiner

*Primary Examiner*—Joseph D Pape

(57) ABSTRACT

A vehicle including an integrated vehicle door hinge and interior handle is disclosed. The integrated vehicle door hinge and interior handle may comprise a door hinge and an interior door release handle, with the door hinge having a hinge support flange pivotally coupled with a vehicle body, and an exposed hinge arm extending from the hinge support flange. The interior door release handle may include a pull handle configured for gripping by a vehicle occupant, and a handle pass through arm extending from the pull handle and connected to the exposed hinge arm, with the handle pass through arm mounted to the door.

20 Claims, 4 Drawing Sheets

Fig. 3
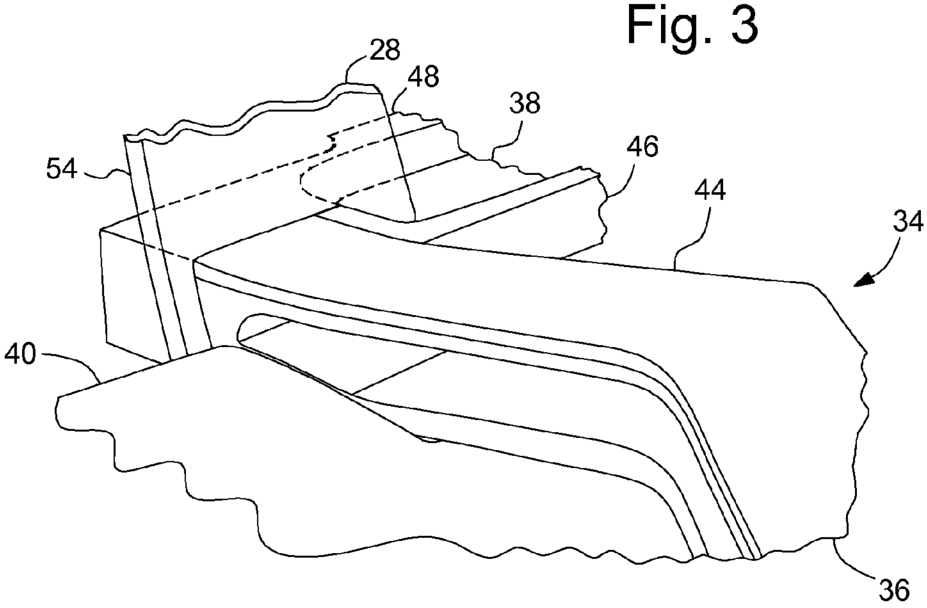
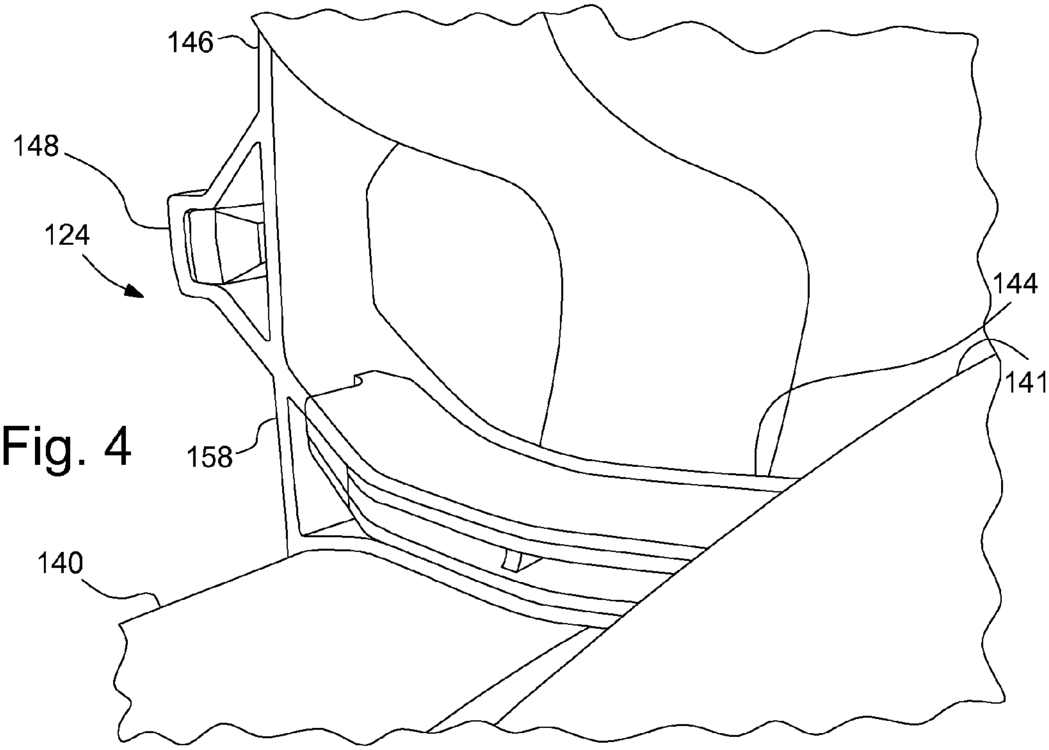
Fig. 4

INTEGRATED VEHICLE DOOR HINGE AND HANDLE

BACKGROUND OF INVENTION

The present invention relates generally to vehicle doors and, in particular, to vehicle doors having a vehicle interior handle integrated with a door hinge.

Much of automotive vehicle design is driven by aesthetics as much as functionality. A difficulty sometimes arises in attaining the desired aesthetics while still maintaining the function of components included in the aesthetic design.

SUMMARY OF INVENTION

An embodiment contemplates an integrated vehicle door hinge and interior handle. The integrated vehicle door hinge and interior handle may comprise a door hinge and an interior door release handle, with the door hinge having a hinge support flange configured to pivotally couple with a vehicle body and an exposed hinge arm extending from the hinge support flange. The interior door release handle includes a pull handle configured for gripping by a vehicle occupant, and a handle pass through arm extending from the pull handle and connected to the exposed hinge arm, with the handle pass through arm configured to mount to a door.

An embodiment contemplates a vehicle comprising a door, a body and an integrated vehicle door hinge and interior handle assembly. The door has an exterior surface and a door trim panel facing a vehicle interior, with the door also having a pivoting end. The body includes a body panel having an exterior surface adjacent to the pivoting end of the door and a body panel opening. The integrated vehicle door hinge and interior handle assembly includes a door hinge having a hinge support flange pivotally coupled to the body, and an exposed hinge arm extending from the hinge support flange, with the exposed hinge arm having an exposed surface extending through the body panel opening, flush with the exterior surface of the body panel; and an interior door release handle including a handle pass through arm extending from the exposed hinge arm through the door trim panel into the vehicle interior.

An embodiment contemplates a vehicle comprising a door and an integrated vehicle door hinge and interior handle assembly, with the door having an exterior surface and a door trim panel facing a vehicle interior. The integrated vehicle door hinge and interior handle assembly may include a door hinge having a hinge support flange configured to pivotally couple with a vehicle body, and an exposed hinge arm extending from the hinge support flange; and an interior door release handle including a pull handle configured for gripping by a vehicle occupant, and a handle pass through arm extending from the pull handle and connected to the exposed hinge arm, the handle pass through arm configured to mount to a door.

An advantage of an embodiment is the integration of a door hinge and an interior door release handle to provide aesthetic appeal, while both the door hinge and the interior door release handle still perform their desired functions. Moreover, these components perform their desired functions while a surface of the hinge is visible along the outer surface of the vehicle in order to add to the aesthetic appeal of the vehicle—thus combining form and function to create a visible and functional link between the interior and exterior of the vehicle.

BRIEF DESCRIPTION OF DRAWINGS

FIG. 3 is a schematic, perspective view of a portion of a door trim panel, an interior door release handle, an exposed hinge arm and a transparent portion of the door.

FIG. 4 is a schematic, perspective view of a portion of a door trim panel, an interior door release handle, and an exposed hinge arm in accordance with a second embodiment.

DETAILED DESCRIPTION

Figure 1:
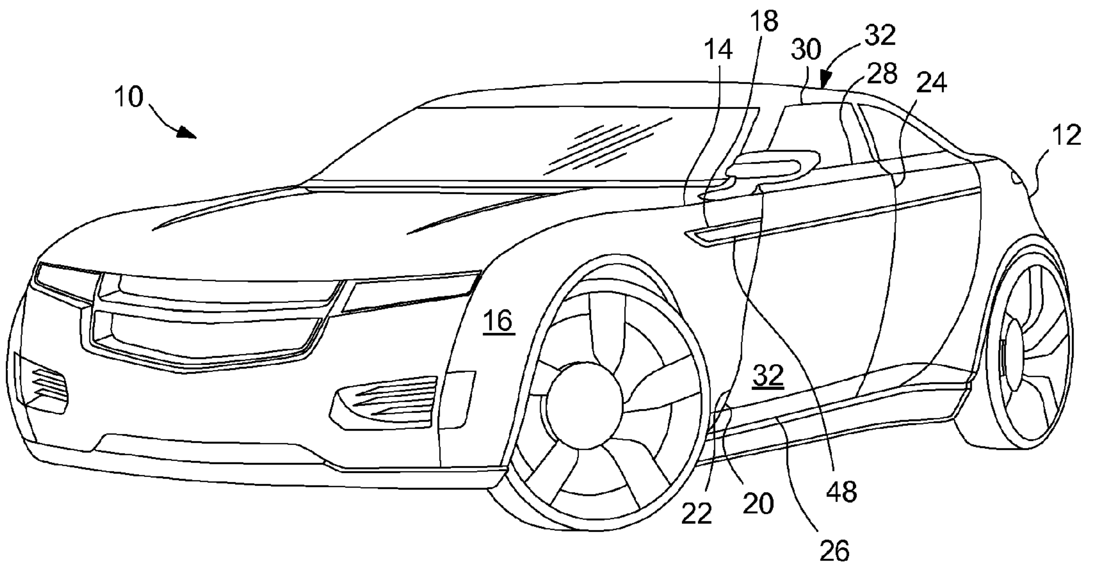
FIG. 1 is a perspective view of a vehicle having the integrated door hinge and interior handle.
Figure 2:
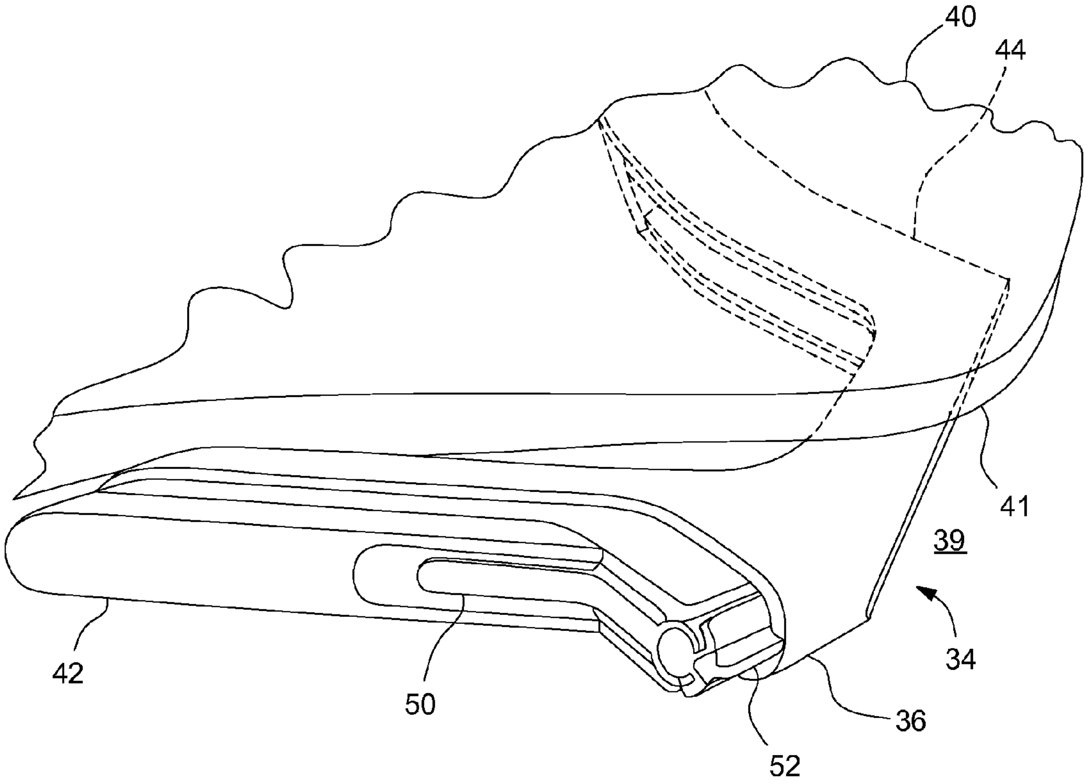
FIG. 2 is a schematic, perspective view of a portion of a door trim panel and an interior door release handle.

Referring to FIGS. 1-3, a vehicle, indicated generally at 10, is shown. The vehicle 10 includes a body 12 having a front quarter panel 14 with an exterior surface 16. The front quarter panel 14 includes a body panel opening 18 near a rear edge 20 of the quarter panel 14, adjacent to a pivoting end 22 of a front door 24. The door 24 includes a lower sheet metal portion 26 and an upper transparent portion 28 adjacent to a movable window 30. The transparent portion 28 and the movable window 30 form a larger overall window 32 in the door 24. An outer surface 32 of the door at the pivoting end 22 is generally flush with the exterior surface 16 of the quarter panel 14. The front door 24 also includes a door trim panel 40 forming an inboard face of the door 24. The door trim panel may include a trim panel extension 41 (only shown in FIG. 2) or other decorative features extending into the vehicle interior 39.

An integrated door hinge and interior handle 34 pivotally connects the front door 24 to the body 12. The integrated door hinge and interior handle 34 includes an interior door release handle 36 connected to a door hinge 38. The interior door release handle 36 includes a pull handle 42 that is configured to allow a passenger to grip the pull handle 42 and pull the door 24 closed. A door release latch switch 50 is mounted on the pull handle 42 and may be electronically connected to a vehicle door latch assembly (not shown) for releasing the door latch when the door release latch switch 50 is actuated. A door lock switch 52 is mounted on the pull handle 42 and may be electronically connected to the vehicle door latch assembly. The interior door release handle 36 also includes a handle pass through arm 44, which extends through the door trim panel 40, connecting the pull handle 42 to the door hinge 38. The handle pass through arm 44 may also extend through an inner part 54 of the upper transparent portion 28 of the door 24. The handle pass through arm 44 is secured to the door 24 in order to support the interior door release handle 36 relative to the door 24.

The door hinge 38 includes an exposed hinge arm 46 that connects to the handle pass through arm 44 and extends forward toward the pivoting end 22 of the door 24. The exposed hinge arm 46 may be bolted (or affixed in another suitable manner) to the handle pass through arm 44. The exposed hinge arm 46 includes an exposed surface 48 that extends into the body panel opening 18 and is flush with the exterior surface 16 of the front quarter panel 14. Being flush, the exposed surface 48 adds visual interest to the vehicle appearance without detracting from the aerodynamics of the vehicle 10. The door hinge 38 also includes a hinge support flange (not shown in this embodiment) that extends from the exposed hinge arm 46 and pivotally attaches to the vehicle body 12. Thus, the interior door release handle 36 is integrated with the door hinge 38 to form the integrated door hinge and interior handle 34, adding a pleasing aesthetic feature to the vehicle 10 while maintaining the functionality of both the interior door release handle 36 and the door hinge 38.

FIG. 4 illustrates a second embodiment. Since this embodiment is similar to the first, similar element numbers will be used for similar elements, but employing 100-series numbers. In this embodiment, the pull handle (not show in this embodiment) may be the same as in the first embodiment, with the handle pass through arm 144 still extending under a trim panel extension 141 and through the door trim panel 140, but not extending through any translucent portion of the door 124. Also, the exposed hinge arm 146 may include a wider main body portion 158, with the exposed surface 148 extending outboard from this main body portion 158.

Figure 5:
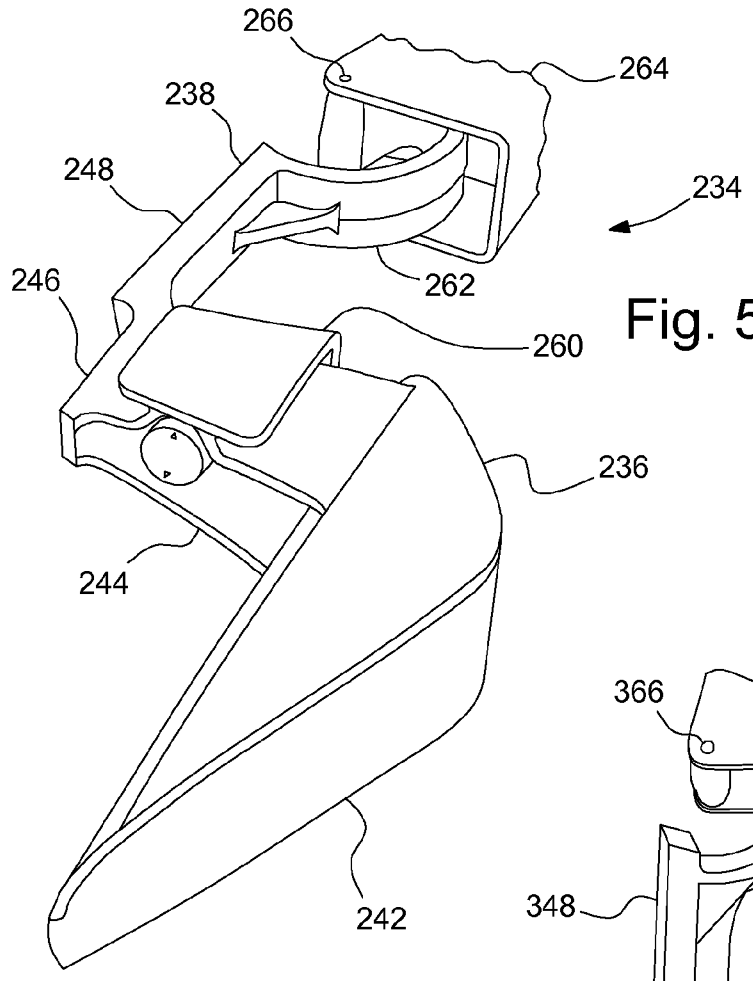
FIG. 5 is a schematic, perspective view of an integrated door hinge and interior handle according to a third embodiment.

FIG. 5 illustrates a third embodiment. Since this embodiment is similar to the first, similar element numbers will be used for similar elements, but employing 200-series numbers. In this embodiment the interior door release handle 236 has a different shaped pull handle 242 (door release latch switch and door lock switch not shown) and a different shaped handle pass through arm 244. But the handle pass through arm 244 still attaches to the exposed hinge arm 246 and is mounted to the door, via a handle support bracket 260. An exposed surface 248 still extends from the exposed hinge arm 246 to create a surface that is exposed on the outer surface of the vehicle. A hinge support flange 262 extends from the exposed hinge arm 246 and pivotally connects to a bodyside hinge support 264 via a hinge pin 266. Again, as with the previous embodiments, the interior door release handle 236 and door hinge 238 are integrated into a single integrated door hinge and interior handle 234.

Figure 6:
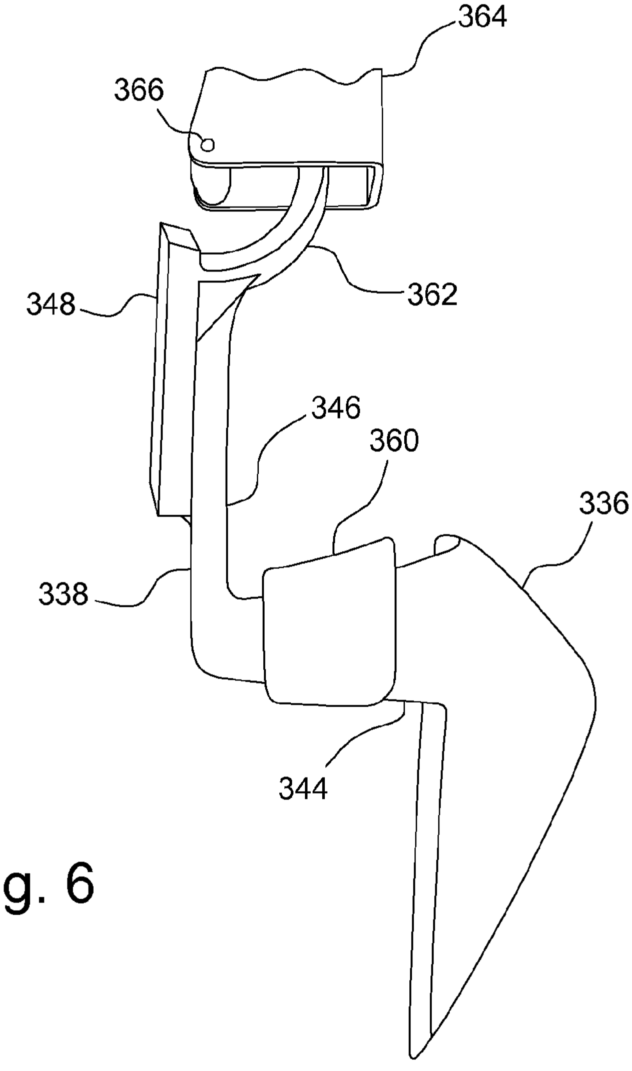
FIG. 6 is a schematic, perspective view of an integrated door hinge and interior handle according to a fourth embodiment.

FIG. 6 illustrates a fourth embodiment. Since this embodiment is similar to the third, similar element numbers will be used for similar elements, but employing 300-series numbers. In this embodiment the interior door release handle 336 and door hinge 338 are basically the same as the third embodiment, but with somewhat different shapes. The hinge support flange 362 still extends from the exposed hinge arm 346 to pivotally engage the bodyside hinge support 362 via a hinge pin 366, and the handle pass through arm 344 is still mounted to the door via a handle support bracket 360. The exposed surface 348 extends outward from the exposed hinge arm 346 differently than that in the third embodiment, but still provides an exposed surface creating a visible feature on the outer surface of the vehicle.

Figure 7:
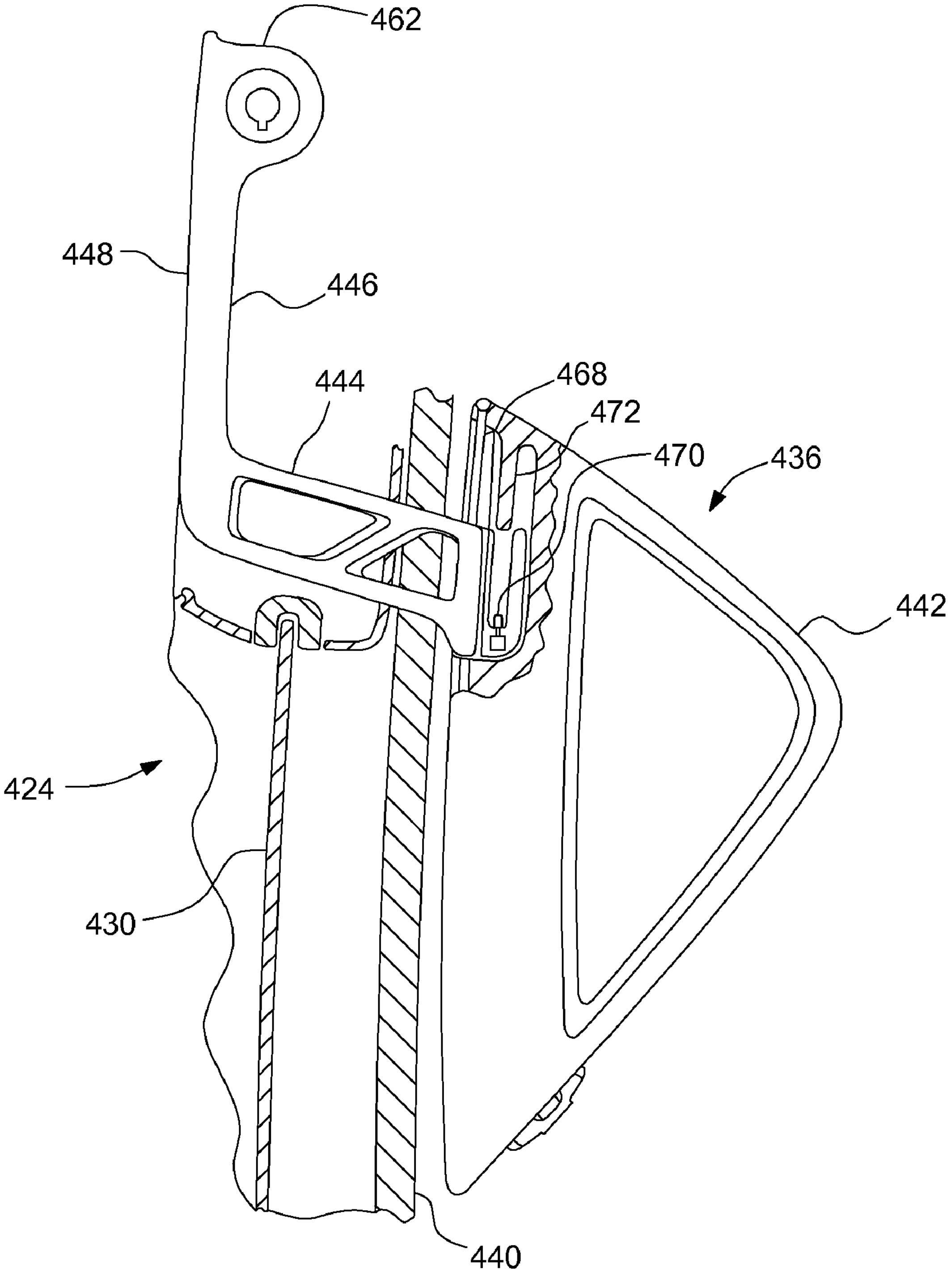
FIG. 7 is a schematic, plan view of a portion of a door and an integrated door hinge and interior handle according to a fifth embodiment.

FIG. 7 illustrates a fifth embodiment. Since this embodiment is similar to the first, similar element numbers will be used for similar elements, but employing 400-series numbers. In this embodiment, the handle pass through arm 444 extends through the door trim panel 440 forward of the window 430. The handle pass through arm 444, though, still engages the exposed hinge arm 446. The exposed surface 448 now extends along essentially the entire length of the exposed hinge arm 446 and over the hinge support flange 462.

The pull handle 442 of the interior door release handle 436 can now slide fore and aft on a slide pin 468 relative to the handle pass through arm 444. A door latch sensor 470 is mounted so that it is fixed relative to the handle pass through arm 444, with a corresponding sensor contact flange 472 mounted to slide with the pull handle 442. The door latch sensor 470 is again electronically connected to a vehicle door latch assembly (not shown). With this configuration, one pulls the pull handle 442 inboard to close the door 424, and pulls aft on the pull handle 442 to cause the sensor contact flange 472 to contact the door latch sensor 470, sending a signal to the vehicle door latch assembly to unlatch the door 424.

While certain embodiments of the present invention have been described in detail, those familiar with the art to which this invention relates will recognize various alternative designs and embodiments for practicing the invention as defined by the following claims.

What is claimed is:

1. An integrated vehicle door hinge and interior handle for use in a vehicle comprising:

a door hinge having a hinge support flange configured to pivotally couple with a vehicle body, and an exposed hinge arm extending from the hinge support flange; and an interior door release handle including a pull handle configured for gripping by a vehicle occupant, and a handle pass through arm extending from the pull handle and connected to the exposed hinge arm, the handle pass through arm configured to mount to a door.

2. The integrated vehicle door hinge and interior handle of claim 1 wherein the exposed hinge arm includes an exposed surface configured to be exposed flush with an exterior surface of the vehicle.

3. The integrated vehicle door hinge and interior handle of claim 1 wherein the interior door release handle includes a door release latch switch configured to electronically connect to a vehicle door latch assembly.

4. The integrated vehicle door hinge and interior handle of claim 3 wherein the pull handle is slidable relative to the handle pass through arm to thereby cause actuation of the door release latch switch.

5. The integrated vehicle door hinge and interior handle of claim 1 wherein the interior door release handle includes a door lock switch configured to electronically connect to a vehicle door latch assembly.

6. The integrated vehicle door hinge and interior handle of claim 1 wherein the handle pass through arm is configured to pass through a transparent portion of a door panel.

7. A vehicle comprising:

a door having an exterior surface, and a door trim panel facing a vehicle interior, the door having a pivoting end;

a body including a body panel having an exterior surface adjacent to the pivoting end of the door and a body panel opening; and an integrated vehicle door hinge and interior handle assembly including a door hinge having a hinge support flange pivotally coupled to the body, and an exposed hinge arm extending from the hinge support flange, the exposed hinge arm having an exposed surface extending through the body panel opening, flush with the exterior surface of the body panel; and an interior door release handle including a handle pass through arm extending from the exposed hinge arm through the door trim panel into the vehicle interior.

8. The vehicle of claim 7 wherein the integrated vehicle door hinge and interior handle assembly includes a pull handle extending from the handle pass through arm in the vehicle interior, the pull handle configured for gripping by a vehicle occupant.

9. The vehicle of claim 8 wherein the interior door release handle includes a door release latch switch configured to electronically connect to a vehicle door latch assembly.

10. The vehicle of claim 9 wherein the pull handle is slidable relative to the handle pass through arm to thereby cause actuation of the door release latch switch.

11. The vehicle of claim 8 wherein the interior door release handle includes a door lock switch configured to electronically connect to a vehicle door latch assembly.

12. The vehicle of claim 7 wherein the handle pass through arm extends through a transparent portion of the door.

13. The vehicle of claim 7 wherein the handle pass through arm extends through the door trim panel forward of a door window.

14. The vehicle of claim 7 wherein the door is a front door and the body panel is a front quarter panel.

15. A vehicle comprising:

a door having an exterior surface and a door trim panel facing a vehicle interior; and an integrated vehicle door hinge and interior handle assembly including a door hinge having a hinge support flange configured to pivotally couple with a vehicle body, and an exposed hinge arm extending from the hinge support flange; and an interior door release handle including a pull handle configured for gripping by a vehicle occupant, and a handle pass through arm extending from the pull handle and connected to the exposed hinge arm, the handle pass through arm configured to mount to a door.

16. The vehicle of claim 15 including a body having a body panel with an exterior surface adjacent to a pivoting end of the door and a body panel opening, and wherein the exposed hinge arm includes an exposed surface extending through the body panel opening, flush with the exterior surface of the body panel.

17. The vehicle of claim 16 wherein the door is a front door and the body panel is a front quarter panel.

18. The vehicle of claim 15 wherein the handle pass through arm extends through a transparent portion of the door.

19. The vehicle of claim 15 wherein the handle pass through arm extends through the door trim panel forward of a door window.

20. The vehicle of claim 15 wherein the interior door release handle includes a door release latch switch configured to electronically connect to a vehicle door latch assembly.

* * * * *